(12) United States Patent
Casiraro (10) Patent No.: US 12,521,175 B2
(45) Date of Patent: Jan. 13, 2026

(54) SYSTEMS FOR FORMING A FISTULA

(71) Applicant: TVA Medical, Inc., Franklin Lakes, NJ (US)

(72) Inventor: Matt Casiraro, Tempe, AZ (US)

(73) Assignee: TVA Medical, Inc., Franklin Lakes, NJ (US)

(*) Notice: Subject to any disclaimer, the term of this patent is extended or adjusted under 35 U.S.C. 154(b) by 818 days.

(21) Appl. No.: 17/787,412

(22) PCT Filed: Dec. 30, 2019

(86) PCT No.: PCT/US2019/068965
§ 371 (c)(1),
(2) Date: Jun. 20, 2022

(87) PCT Pub. No.: WO2021/137851
PCT Pub. Date: Jul. 8, 2021

(65) Prior Publication Data
US 2023/0014740 A1     Jan. 19, 2023

(51) Int. Cl.
*A61B 18/14*     (2006.01)
*A61B 17/00*     (2006.01)
(Continued)

(52) U.S. Cl.
CPC ...... *A61B 18/1492* (2013.01); *A61B 2017/00876* (2013.01); *A61B 2018/00404* (2013.01); *A61B 2090/061* (2016.02); *A61M 25/0127* (2013.01)

(58) Field of Classification Search
CPC ............... A61B 18/04; A61B 18/1492; A61B 2018/00404; A61B 2018/00708;
(Continued)

(56) References Cited

U.S. PATENT DOCUMENTS

| 4,905,698 A | 3/1990 | Strohl, Jr. et al. |
| 5,395,033 A | 3/1995 | Byrne |

(Continued)

FOREIGN PATENT DOCUMENTS

| EP | 630612 A1 | 12/1994 |
| WO | WO2015108984 A | 7/2015 |
| WO | WO2016183039 A | 11/2016 |

OTHER PUBLICATIONS

Becton Dickinson and Bard "More Options for EndoAVF Creation WavelinQ 4F EndoAVF System", Product Brochure 2019, pp. 1-6.
(Continued)

*Primary Examiner* — Michael F Peffley
*Assistant Examiner* — Samantha M Good
(74) *Attorney, Agent, or Firm* — Dickinson Wright PLLC; Andrew D. Dorisio; Nicholas P. Coleman (57) ABSTRACT

A system for forming a fistula includes a first catheter, a second catheter, one or more magnetic field sensors, a user output device, and a control unit. The first catheter includes one or more first catheter magnetic elements and a fistula-forming element. The second catheter includes one or more second catheter magnetic elements. The one or more magnetic field sensors are configured to output a magnetic field signal. The control unit is configured to determine a distance of separation of the first catheter from the second catheter based the magnetic field signal from the one or more magnetic field sensors and output a ready signal with the user output device in response to determining that the distance of separation of the first catheter from the second catheter is a predetermined distance or less.

20 Claims, 4 Drawing Sheets

(51) Int. Cl.
*A61M 25/01* (2006.01)
*A61B 18/00* (2006.01)
*A61B 90/00* (2016.01)

(58) Field of Classification Search
CPC .......... A61B 2018/00898; A61B 2017/00876; A61B 2017/11; A61B 2017/1103; A61B 2017/1107; A61B 2090/061; A61B 17/11; A61M 25/0127
See application file for complete search history.

(56) References Cited

U.S. PATENT DOCUMENTS

| | | | |
|---|---|---|---|
| 5,425,367 A | 6/1995 | Shapiro et al. | |
| 6,332,089 B1 | 12/2001 | Acker et al. | |
| 7,387,636 B2 | 6/2008 | Cohn et al. | |
| 7,729,738 B2 | 6/2010 | Flaherty et al. | |
| 7,881,769 B2 | 2/2011 | Sobe | |
| 8,271,095 B2 | 9/2012 | O'Sullivan | |
| 9,017,323 B2 | 4/2015 | Miller et al. | |
| 9,486,276 B2 | 11/2016 | Rios et al. | |
| 10,124,144 B2 | 11/2018 | Avneri et al. | |
| 10,695,534 B2 | 6/2020 | Pate | |
| 10,821,217 B2 | 11/2020 | Pate | |
| 11,026,743 B2 | 6/2021 | Pate et al. | |
| 2004/0147837 A1* | 7/2004 | Macaulay | A61B 8/0833 600/117 |
| 2015/0258308 A1* | 9/2015 | Pate | A61B 18/1492 606/41 |
| 2017/0049991 A1* | 2/2017 | Avneri | A61B 17/12109 |
| 2018/0133441 A1 | 5/2018 | Kellerman | |
| 2019/0133678 A1 | 5/2019 | Pate et al. | |
| 2019/0134349 A1 | 5/2019 | Cohn et al. | |
| 2019/0275293 A1 | 9/2019 | Lenihan et al. | |

OTHER PUBLICATIONS

International Search Report and Written Opinion dated Aug. 24, 2020, in International Application No. PCT/US2019/068965.

\* cited by examiner

SYSTEMS FOR FORMING A FISTULA

CROSS-REFERENCE TO RELATED APPLICATIONS

This application is a U.S. National Phase of International Application No. PCT/US2019/068965, entitled "SYSTEMS FOR FORMING A FISTULA" and filed Dec. 30, 2019, which is incorporated herein by reference in its entirety.

TECHNICAL FIELD

The present specification generally relates to systems and methods for forming a fistula, and, more specifically, systems and methods for forming a fistula using first and second catheters, wherein magnetic field sensors allow for determination of appropriate positions of catheters for fistula formation.

BACKGROUND

A fistula is generally a passageway formed between two internal organs. Forming a fistula between two blood vessels can have one or more beneficial functions. For example, the formation of a fistula between an artery and a vein may provide access to the vasculature for hemodialysis patients. Specifically, forming a fistula between an artery and a vein allows blood to flow quickly between the vessels while bypassing the capillaries. Needles, catheters, or other cannulas may then be inserted into the blood vessels near the fistula to draw blood from the circulatory system, pass it through a dialysis machine, and return it to the body. The quickened flow provided by the fistula may provide for effective hemodialysis. Generally, fistula formation requires the surgical dissection of a target vein, transecting and moving the vein for surgical anastomosis to the artery. These fistulas typically have a primary failure rate (failure before the patient receives dialysis) of about 30-60%, and take between 1 and 12 months (e.g., 4-8 weeks) before the fistula is usable for dialysis. It may be useful to find improved ways to form a fistula between two blood vessels.

SUMMARY

These and additional features provided by the embodiments described herein will be more fully understood in view of the following detailed description, in conjunction with the drawings.

In one embodiment, a system for forming a fistula includes a first catheter configured to be advanced through a first vessel, a second catheter configured to be advanced through a second vessel, one or more magnetic field sensors, a user output device configured to output a ready signal, and a control unit communicatively coupled to the one or more magnetic field sensors and the user output device. The first catheter includes one or more first catheter magnetic elements and a fistula-forming element. The second catheter includes one or more second catheter magnetic elements. The one or more first catheter magnetic elements and the one or more second catheter magnetic elements are configured to draw the first catheter and the second catheter together. The one or more magnetic field sensors are configured to output a magnetic field signal indicative of a magnitude of a magnetic field produced between the one or more first catheter magnetic elements and the one or more second catheter magnetic elements. The control unit is configured to receive the magnetic field signal from the one or more magnetic field sensors, determine a distance of separation of the first catheter from the second catheter based the magnetic field signal from the one or more magnetic field sensors, and output the ready signal with the user output device in response to determining that the distance of separation of the first catheter from the second catheter is a predetermined distance or less, wherein the ready signal is indicative of proper alignment and position of the first catheter and the second catheter to form the fistula with the fistula-forming element.

In another embodiment, a system for forming a fistula includes a first catheter configured to be advanced through a first vessel, a second catheter configured to be advanced through a second vessel, a probe configured to be positioned external to a treatment site, a user output device configured to output a ready signal, and control unit communicatively coupled to the one or more magnetic field sensors and the user output device. The first catheter included one or more first catheter magnetic elements and a fistula-forming element. The second catheter includes one or more second catheter magnetic elements. The one or more first catheter magnetic elements and the one or more second catheter magnetic elements are configured to draw the first catheter and the second catheter together. The probe is configured to be positioned external to a treatment site and includes one or more magnetic field sensors configured to output a magnetic field signal indicative of a magnitude of a magnetic field produced between the one or more first catheter magnetic elements and the one or more second catheter magnetic elements. The control unit is configured to receive the magnetic field signal from the one or more magnetic field sensors, determine a distance of separation of the first catheter from the second catheter based the magnetic field signal from the one or more magnetic field sensors, and output the ready signal with the user output device in response to determining that the distance of separation of the first catheter from the second catheter is a predetermined distance or less, wherein the ready signal is indicative of proper alignment and position of the first catheter and the second catheter to form the fistula with the fistula-forming element.

In yet another embodiment, a method for forming a fistula includes advancing a first catheter through a first vessel, wherein the first catheter comprises one or more first catheter magnetic elements and a fistula-forming element, advancing a second catheter through a second vessel, wherein the second catheter comprises one or more second catheter magnetic elements, aligning the one or more first catheter magnetic elements with the one or more second catheter magnetic elements, detecting a magnetic field produced between the one or more first catheter magnetic elements and the one or more second catheter magnetic elements with one or more magnetic field sensors, determining a distance of separation of the first catheter from the second catheter based on a magnetic field signal from the one or more magnetic field sensors, generating a ready signal with user output device in response to determining that the distance of separation of the first catheter from the second catheter is a predetermined distance or less, wherein the ready signal is indicative of proper alignment and position of the first catheter and the second catheter, and forming the fistula with the fistula-forming element in response to the ready signal.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments provided herein are directed to systems and methods for forming a fistula. Systems according to the present disclosure generally include a first catheter configured to be advanced through a first vessel and a second catheter configured to be advanced through a second vessel. At least one of the first catheter and the second catheter includes a fistula-forming element, such as an electrode. Additionally, the first and second catheters include one or more magnetic elements configured to draw the first catheter and the second catheter toward one another. By drawing the first and second catheters together tissue of the first and second vessels may become impinged therebetween and operation of the fistula-forming element may be used to form an opening (i.e., a fistula) between the first vessel and the second vessel. However, ensuring proper alignment and distance of the first catheter and the second catheter relative to one another may be challenging. For example, fluoroscopy may be used to indicate positions of the first and second catheters. However, fluoroscopy provides visual feedback in a 2-dimensional plane, which may make it difficult to ensure proper 3-dimensional alignment.

The present concept is directed to using one or more magnetic field sensors that detect the magnetic field produced between the magnetic elements of the first and second catheters. Based on the detected magnetic field, a control unit may determine distance and/or alignment of the first and second catheters. When the appropriate distance and alignment has been reached, a signal may be output by the control unit, which alerts an operator that the first and second catheters are correctly positioned for fistula formation. In some embodiments, the control unit may be operable to prevent operation and/or activation of the fistula-forming element when the control unit determines that the first and second catheters are not positioned within an appropriate distance of one another or otherwise improperly aligned. Various embodiments of the testing device and the operation of the testing device will be described in more detail herein.

Any suitable catheter or catheters may be used to form fistulas using the methods and/or systems described here. The systems and methods described herein may use one or more of the devices as described in U.S. patent application Ser. No. 13/298,169, filed on Nov. 16, 2011, entitled "DEVICES AND METHODS FOR FORMING A FISTULA," U.S. patent application Ser. No. 14/052,477, filed Nov. 8, 2019, entitled "DEVICES AND METHODS FOR FORMING A FISTULA," U.S. patent application Ser. No. 14/214,503, filed Mar. 14, 2014, entitled "FISTULA FORMATION DEVICES AND METHODS THEREFOR," U.S. patent application Ser. No. 14/657,997, filed Sep. 17, 2015, entitled "Fistula Formation Devises and Methods Therefor," U.S. patent application Ser. No. 15/406,755, filed Jul. 20, 2017, entitled "DEVICES AND METHODS FOR FORMING A FISTULA," and U.S. patent application Ser. No. 16/024,241 Filed Jun. 29, 2018, entitled "SYSTEMS AND METHODS FOR ADHERING VESSELS," each of which are hereby incorporated by reference in their entireties.

Figure 1:
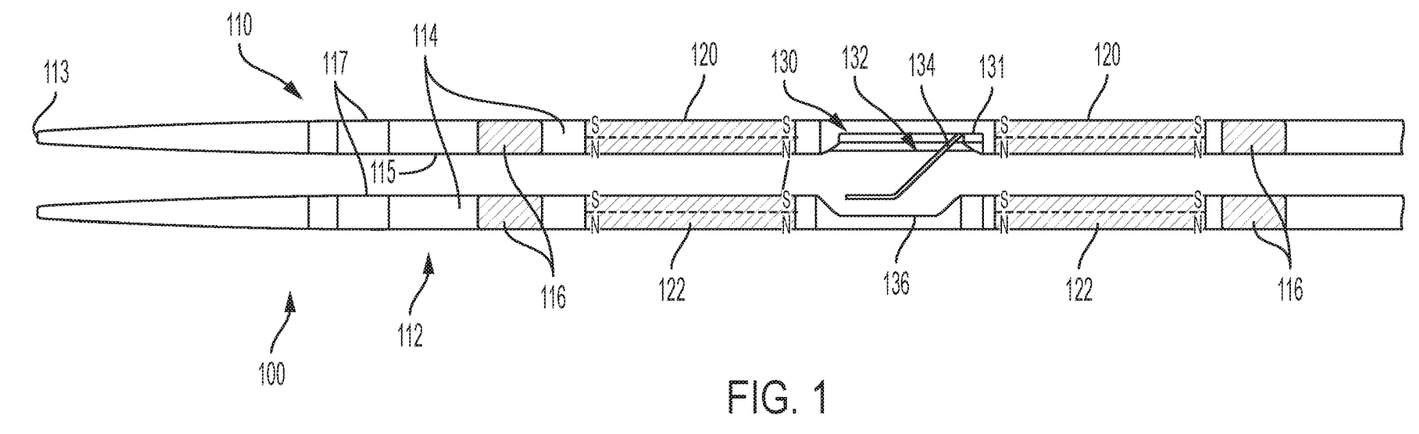
FIG. 1 depicts a system for forming a fistula, according to one or more embodiments shown and described herein.

In some variations, a fistula may be formed using a first catheter placed in a first vessel (e.g., an artery) and a second catheter placed in a second vessel (e.g., a vein). FIG. 1 illustrates one variation of a system 100 that may be used to form a fistula between the first vessel and the second vessel. As shown there, system 100 may include a first catheter 110 and a second catheter 112. The first catheter 110 may include a catheter body 114 and a fistula-forming element 132. The fistula-forming element 132 may be advanced or biased out of an opening 130 in the catheter body 114. For example, the fistula-forming element 132 may be positioned proximal to a tip 113 of the first catheter 110 and may be extendable from a sidewall 115 of the first catheter 110 of the catheter body 114. In other embodiments, the fistula-forming element 132 may not be movable relative to the catheter body 114

Figure 2:
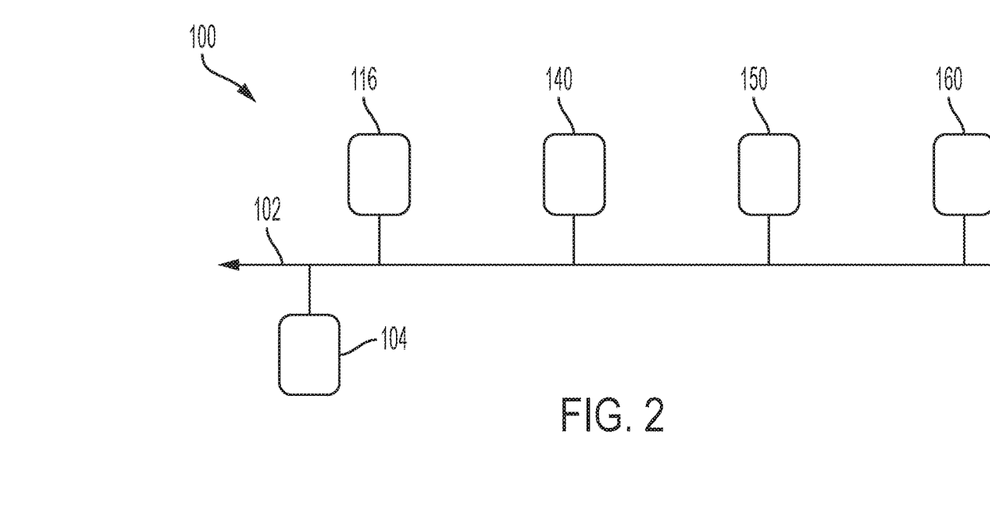
FIG. 2 schematically depicts a system for forming a fistula, according to one or more embodiments shown and described here.

The fistula-forming element 132 may be any device operable to form an opening between a first vessel (e.g., a vein) and a second vessel (e.g., an artery). For example, the fistula-forming element 132 may be any cutting, puncturing, and/or ablating device, such as a knife, needle, and/or an electrode. In the illustrated embodiment, the fistula-forming element 132 includes an electrode 134. Current may be passed through the electrode 134 to ablate or otherwise remove tissue contacted by the electrode 134. In some variations, the first catheter 110 may have an insulated housing 131 (e.g., a ceramic housing or the like) within the catheter body 114, which may help protect other components of the first catheter 110 from heat that may be generated by the electrode 134 during tissue removal/ablation. In embodiments, the electrode 134 may be selectively moved from a position in which the electrode 134 is retained or otherwise held within the catheter body 114 to a position in which the electrode 134 extends away from a sidewall 115 of the catheter body 114 (such as shown in FIG. 2). The electrode 134 may also be selectively moved back to a retracted/low-profile position (either the same or a different position as the previous retracted position) following ablation of tissue. In some variations, the electrode 134 may be biased toward an extended position when not otherwise restrained by the catheter body 114.

While a fistula-forming element 132 including an electrode 134 is shown in FIG. 1, it should be appreciated that the embodiments may include a catheter having any suitable fistula-forming element 132 (e.g., one or more electrodes/electrocautery mechanisms, one or more mechanical cutting mechanisms such as blades, lances, needles, or the like, one or more chemical devices, cryogenic-cautery devices, laser ablation devices, combinations thereof and the like), such as those described in more detail in U.S. patent application Ser. No. 13/298,169, U.S. patent application Ser. No. 14/052,477, U.S. patent application Ser. No. 14/214,503, U.S. patent application Ser. No. 14/657,997, U.S. patent application Ser. No. 15/406,755, and U.S. patent application Ser. No. 16/024,241, which were previously incorporated by reference in their entireties, and may be operated in any manner as described therein.

The second catheter 112 may have any suitable elements or combination of elements to aid in forming a fistula between it and the first catheter 110. For example, the second catheter 112 may comprise a catheter body 114 having a recess 136 extending therein. The recess 136 may be coated by an insulating material (not shown), which may act as a backstop to receive and contact the electrode 134 (or other fistula-forming element 132) of the first catheter 110 without damaging one or more components of the second catheter 112. Additionally or alternatively, the second catheter 112 may include one or more fistula-forming elements, which may be the same as or different from the fistula-forming element of the first catheter 110.

Each of the first and second catheters 110, 112 includes one or more alignment elements, which may help to position catheters within the vasculature. The one or more alignment elements help to bring two catheters (and with them, associated blood vessels) in closer approximation so that a fistula may be formed between associated blood vessels. Additionally or alternatively, the one or more alignment elements may be used to position the one or more catheters in a specific rotational configuration relative to the blood vessels and/or the other catheters. Additionally or alternatively, the one or more alignment elements may be used to position one or more catheters axially within a blood vessel or blood vessels. For example, the one or more alignment elements may be configured to position a fistula-forming element 132 of a catheter relative with the first vessel and the second vessel such that activation of the fistula-forming element 132 directs fistula formation between the two vessels.

The one or more alignment elements may include one or more magnetic elements (e.g., magnetic elements 120 and/or 122). Examples of magnet arrangements for use with the catheters described here may be found in U.S. patent application Ser. No. 13/298,169, U.S. patent application Ser. No. 14/052,477, U.S. patent application Ser. No. 14/214,503, U.S. patent application Ser. No. 14/657,997, U.S. patent application Ser. No. 15/406,755, and U.S. patent application Ser. No. 16/024,241, which were previously incorporated by reference in their entireties. These magnetic alignment elements may be attracted to one or more additional elements (e.g., one or more portions of a second catheter 112, one or more magnets or other components placed externally from the body) to help position or align the catheter within a vessel. For example, one or more magnets placed outside of the body may interact with the magnetic alignment components of a catheter to help facilitate advancement of the catheter through the vasculature. Additionally or alternatively, one or more magnetic elements of a first catheter 110 may interact with one or more magnetic elements of a second catheter 112 to attract the first and second catheters 110, 112 toward each other, and/or to bias the first and second catheters 110, 112 toward a specific rotational and/or axial alignment.

For example, in the variation of system 100 shown in FIG. 1, the first catheter 110 may include one or more first catheter magnetic elements 120 and the second catheter 112 may include one or more second catheter magnetic elements 122. These magnetic elements 120, 122 may be configured to bias the axial positioning of the first and second catheters 110, 112 such that the opening 130 of the first catheter 110 axially aligns with the recess 136 of the second catheter 112. The magnetic elements 120, 122 may also be configured to bias the rotational positioning of the first and second catheters 110, 112 such that the opening 130 of the first catheter 110 faces toward the recess 136 of the second catheter 112. Accordingly, the one or more magnetic elements 120, 122 may be used to help position the first and second catheters 110, 112 within respective vessels (e.g., arteries/veins) such that the electrode 134 may extend from the opening 130 toward recess 136 of the second catheter 112 during fistula formation.

The one or more first catheter magnetic elements 120 may include one or more magnets or magnetic arrays positioned distal and/or proximal to the fistula-forming element 132. For example, the one or more first catheter magnetic elements 120 may be positioned both proximal and distal to the fistula-forming element 132, such that there are one or more magnets or magnetic arrays positioned on either side of the fistula-forming element 132. Similarly, the one or more second catheter magnetic elements 122 may include one or more magnets or magnetic arrays positioned distal and/or proximal to the recess 136. For example, the one or more second catheter magnetic elements 122 may be positioned both proximal and distal to the recess 136 and correspond to the one or more first catheter magnetic elements 120. The one or more first catheter magnetic elements 120 and the one or more second catheter magnetic elements 122 may include temporary magnets, permanent magnets, and/or electromagnets.

In some embodiments, the first and/or second catheters 110, 112 may include one or more markers 117 for visualizing advancement and positioning thereof. In some variations, the marker 117 may be directly visualized. In other variations, the marker may be indirectly visualized (e.g., via ultrasound, fluoroscopy and/or X-ray visualization). Markers 117 may be located anywhere relative to the catheter, e.g., one or more surfaces of the catheter, inside of the catheter. In some variations, one or more portions of the catheter may be made from an echogenic or radiographic material. A marker may be attached to a catheter by any suitable method, for example, by mechanical attachment (e.g., embedded in a portion of the catheter, circumferential circumscription, or the like), adhesive bonding, welding, soldering, combinations thereof or the like. For example, in the variation of system 100 shown above in FIG. 1, each of the first and second catheters 110, 112 may include one or more markers 117. These markers 117 may be visualized during advancement and/or positioning of the first and second catheters 110, 112 to confirm that the catheters are properly positioned within the blood vessels. For example, in variations where the opening 130 of the first catheter 110 is axially aligned with the recess 136 of the second catheter 112 and/or the opening 130 of the first catheter 110 is rotationally aligned relative to the recess 136 of the second catheter 112, the one or more markers 117 may be used, through one or more visualizing techniques (e.g., ultrasound, fluoroscopy and/or X-ray), to confirm this positioning of the first and second catheters 110, 112 with the first and second vessels, prior to formation of the fistula.

However, as noted above, such visualizing techniques may be subject to error. For example, though the first and second catheters 110, 112 may appear aligned under 2-dimensional fluoroscopy, the first and second catheters 110, 112 may not be aligned in 3-dimensional space. As will be described in greater detail below, instead of the one or more markers 117 and/or in addition to the one or more markers 117, the system 100 may include one or more magnetic field sensors 116, which may be used to determine alignment and/or positioning of the first and second catheters 110, 112 relative to one another.

FIG. 2 schematically illustrates modules of the system 100 that may be communicatively coupled to one another over a communication path 102. The system 100 generally includes a control unit 104, the one or more magnetic field sensors 116, and a user output device 140. In yet further embodiments, the system 100 may further include a power source 160 and/or a safety device such as a locking mechanism 150.

The various electronic components of the system 100 are communicatively coupled to one another over the communication path 102. The communication path 102 may be a bus, which connects the various components of the system 100. The communication path 102 may be formed from any medium that is capable of transmitting a signal such as, for example, conductive wires, conductive traces, optical waveguides, or the like. Moreover, the communication path 102 may be formed from a combination of mediums capable of transmitting signals. In some embodiments, the communication path 102 includes a combination of conductive traces, conductive wires, connectors, and buses that cooperate to permit the transmission of electrical data signals between the various components of the components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The control unit 104 can be any type of computing device and includes one or more processors and one or more memory modules. The one or more processors may include any device capable of executing machine-readable instructions stored on a non-transitory computer-readable medium, such as those stored on the one or more memory modules. Accordingly, each of the one or more processors may include a controller, an integrated circuit, a microchip, a computer, and/or any other computing device.

The one or more memory modules of the control unit 104 are communicatively coupled to the one or more processors. The one or more memory modules may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the control unit 104 and/or external to the control unit 104. The one or more memory modules may be configured to store logic (i.e., machine readable instructions) that, when executed by the one or more processors, allow the control unit 104 to, for example, determine a distance of separation of the first catheter 110 from the second catheter 112 and/or alignment of the first catheter 110 and the second catheter 112 and output a ready signal (e.g., with a user output device 140) in response to determining that the distance of separation of the first catheter 110 from the second catheter 112 is within a predetermined threshold. In some embodiments, where the distance of separation is determined to be larger than the predetermined threshold (e.g., greater than about 2 mm, greater than about 1.5 mm, greater than about 1 mm, or other predetermined threshold distance) or the control unit 104 determines that the first and second catheters 110, 112 are otherwise not in alignment, the logic executed by the one or more processors may prevent operation of the fistula-forming element 132.

Figure 3:
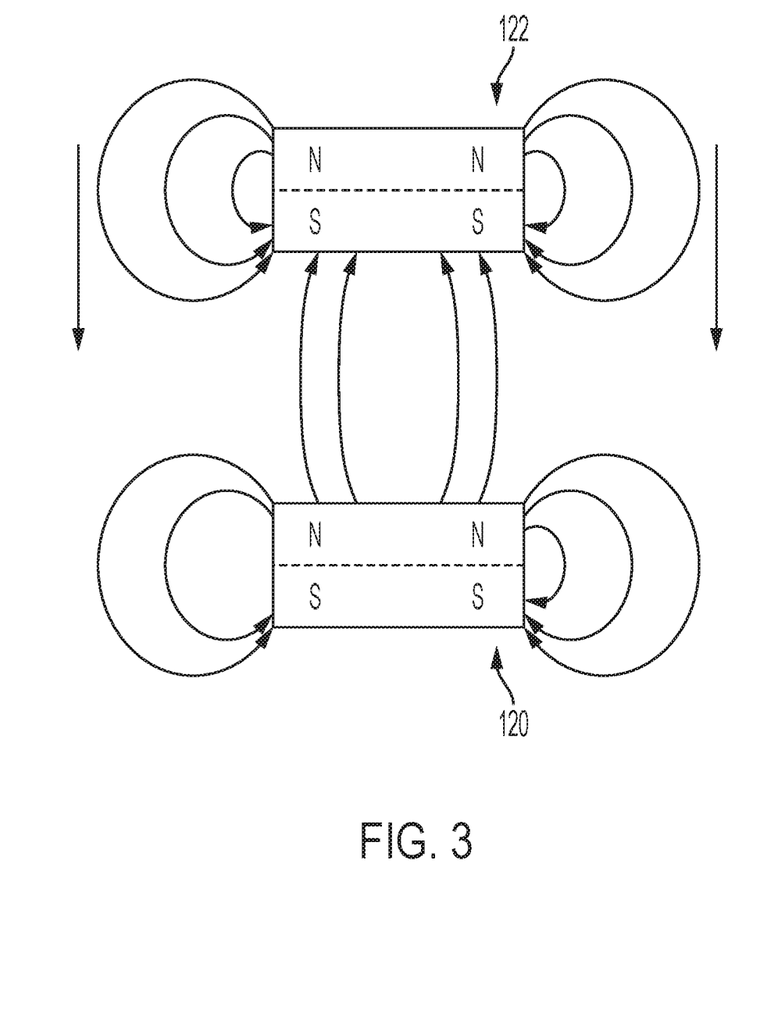
FIG. 3 schematically illustrates magnetic field lines, according to one or more embodiments shown and described herein.
Figure 4:
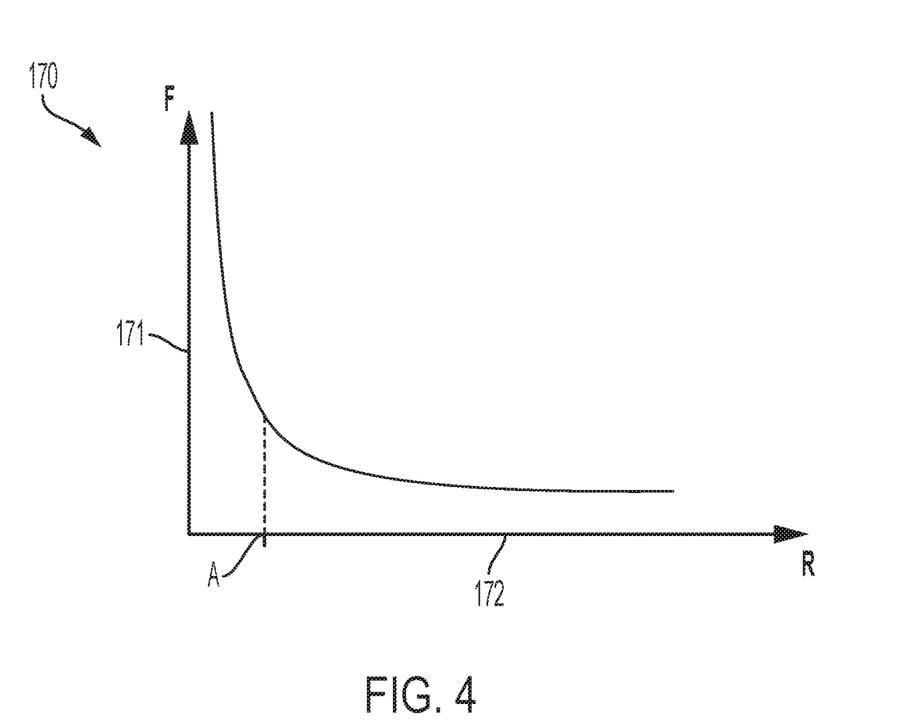
FIG. 4 depicts a graph illustrating the relationship between magnetic force versus distance, and FIG. 5 schematically illustrates a system for forming a fistula including an external probe, according to one or more embodiments shown and described herein.

As noted above, the system 100 includes one or more magnetic field sensors 116. The one or more magnetic field sensors 116 provide alignment information of the first catheter 110 and the second catheter 112 relative to one another. A magnetic field sensor 116 may include any device configured to output a magnetic field signal indicative of a magnitude of the magnetic field, e.g., the force of the magnetic field. Such magnetic field sensors 116 may include, but are not limited to Hall Effect sensors, magnetoresistive sensors, microelectromechanical systems (MEMs) magnetic field sensors 116, superconducting quantum interference device (SQUID) sensors, or the like. FIG. 3 schematically illustrates magnetic field lines between a first catheter magnetic element 120 and a second catheter magnetic element 122. As the first catheter magnetic element 120 moves closer to the second catheter magnetic element 122, the force of the magnetic attraction between the first catheter magnetic element 120 and the second catheter magnetic element 122 increases. FIG. 4 graphically illustrates the logarithmic relationship between distance 172 on the x-axis and force 171 on the y-axis, as taught by Coulomb's law:

$$F = \frac{1}{r^2}$$

where F is force of attraction and r is the distance of separation between magnetic elements 120, 122. That is, force of attraction is inversely proportional to the square of the distance of separation. The magnetic field signal output by the one or more magnetic field sensors 116 provides a measurement indicative of the force of the magnetic attraction between magnetic elements 120, 122. In operation, the control unit 104 receives the magnetic field signal from the one or more magnetic field sensors 116, and executes logic to determine the distance of separation of the first catheter 110 from the second catheter 112 using Coulomb's law, above. Once a predetermined distance of separation, A, is reached, the control unit 104 may provide a notification to an operator that the first and second catheter 110, 112 are properly positioned.

Additionally, to provide increased attraction and alignment, the one or more first catheter magnetic elements 120 and the one or more second catheter magnetic elements 122 may be arranged with opposite poles facing one another. That is, for example, the one or more first catheter magnetic elements 120 may be arranged such that the north pole is aligned on the side of the catheter body 114 with the fistula-forming element 132 and the one or more second catheter magnetic elements 120 may be arranged such that the south pole is aligned on the side of the catheter body 114 with the recess 136 for receiving the fistula-forming element 132, or vice versa. Accordingly, wherein the poles are not properly aligned for attraction, no magnetic field or a weaker magnetic field would be produced. Accordingly, the size of the magnetic field sensed based on the magnetic field signal may indicate both distance of the first catheter 110 from the second catheter 112 and alignment of the first catheter 110 and the second catheter 112.

During fistula formation, the distance of separation between the first catheter 110 and the second catheter 112 should be within a predetermined threshold for fistula formation. For example, the predetermined threshold may be about 2 mm or less, such as about 1.5 mm or less, 1 mm or less, or the like. The predetermined threshold or distance is any distance at which forming a fistula with the fistula-forming element 132 is or has been shown to be possible. For example, such predetermined distance may allow the fistula-forming element 132 to fully extend through a wall of a first vessel and through a wall of a second vessel to contact the recess 136 of the second catheter 112, thereby forming an opening between the first vessel and the second vessel. Accordingly, and as will be explained in greater detail below, when the control unit 104 determines that the distance of separation between the first catheter 110 and the second catheter 112 is, for example, 1 mm or less between the portion of the first catheter 110 including the fistula forming element 132 and the portion of the second catheter 110 including the recess 136, than the control unit 104 determines that proper distance and alignment has been achieved between the first catheter 110 and the second catheter 112.

Figure 5:
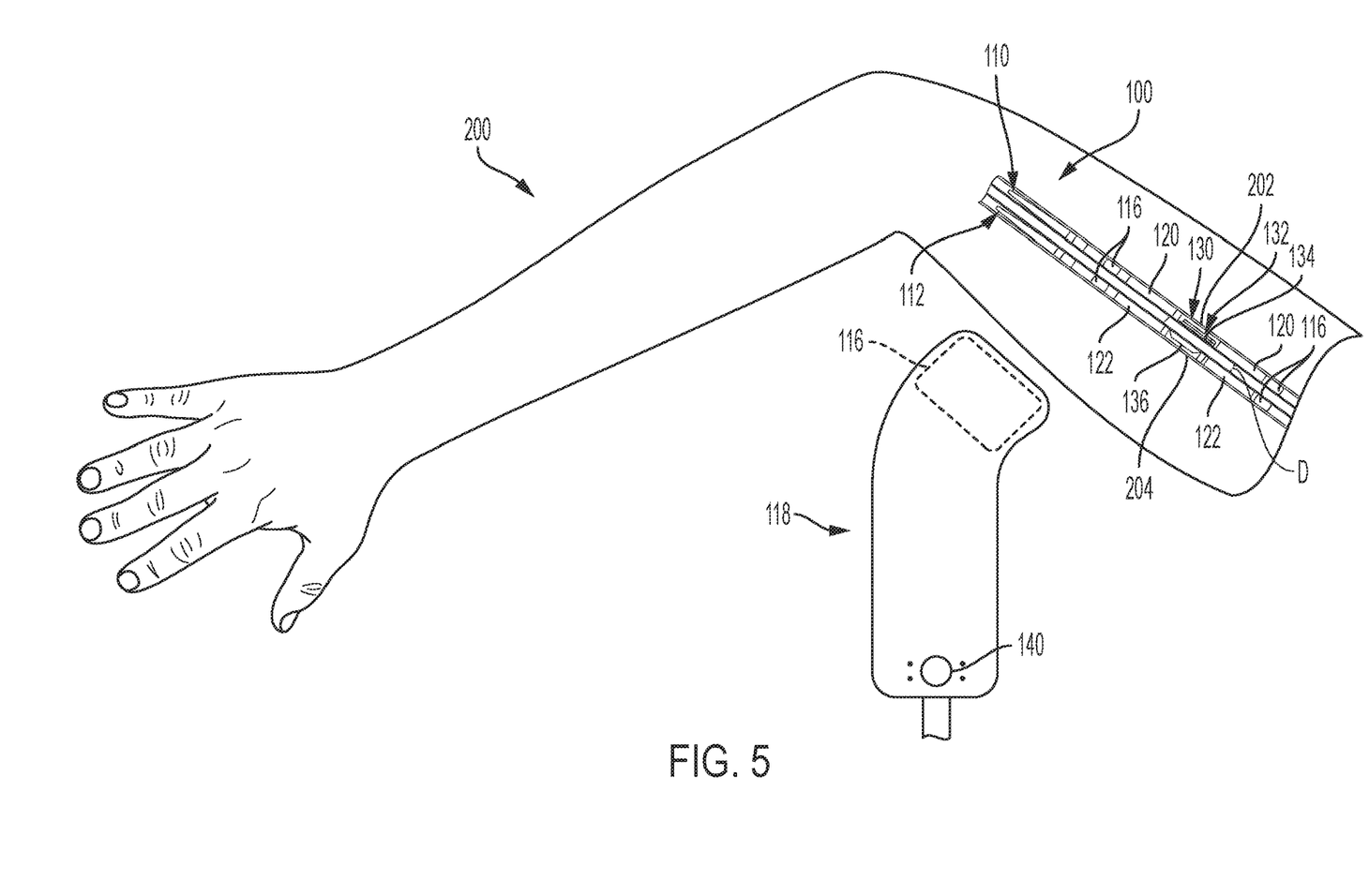

The one or more magnetic field sensors 116 may be mounted to and/or within the catheter body 114 of the first catheter 110, the second catheter 112 or both, as illustrated in FIG. 1. In some embodiments, one or more magnetic field sensors 116 may be instead mounted to an external probe 118, as illustrated in FIG. 5.

In the embodiment illustrated in FIG. 1, the one or more magnetic field sensors 116 may be integrated into the first and/or the second catheter 110, 112. That is, the one or more magnetic field sensors 116 are advanced through the one or more vessels with the first and/or second catheter 110, 112. The one or more magnetic field sensors 116 may be positioned proximal and/or distal to the one or more magnetic elements 120, 122 of the first and/or the second catheter 110, 112. For example, a magnetic field sensor 116 may be mounted to the first catheter 110 distal (e.g., closer to the tip 113) of the one or more first catheter magnetic elements 120 and/or the fistula-forming element 132. In some embodiments, a magnetic field sensor 116 may be located proximal to the one or more first catheter magnetic elements 120 and the fistula-forming element 132. In some embodiments, a first magnetic field sensor may be associated with a first magnetic element of the first catheter 110 and a second magnetic field sensor may be associated with a second magnetic element of the first catheter 110 on either side of the fistula-forming element 132.

In some embodiments, a magnetic field sensor 116 may only be incorporated into one of the first catheter 110 and the second catheter 112. For example, the second catheter 112 may include a magnetic field sensor 116 mounted to the catheter body 114 of the second catheter 112 distal and/or proximal of the one or more magnetic elements 120 of the second catheter 112 and the recess 136. In some embodiments, each of the first catheter 110 and the second catheter 112 include one or more magnetic field sensors 116. It is noted that additional magnetic field sensors may provide greater sensitivity to alignment and separation distance. The one or more magnetic field sensors 116 may be closely situated to the one or more first catheter magnetic elements 120 and/or the one or more second catheter magnetic elements 122 (e.g., spaced about 10 mm or less from the one or more magnetic elements).

As noted above, and with reference to FIG. 5, the one or more magnetic field sensors 116, in addition to and/or instead of any catheter-mounted magnetic field sensors 116, may be mounted to an external probe 118. The external probe 118 may be a handheld probe or may be mounted to a robotic arm or other fixture configured to hold the probe proximate to a treatment portion of a patient. For example, FIG. 5, illustrates an arm 200 of a patient with a first catheter 110 positioned within a first vessel 202 (e.g., a vein) and a second catheter 112 positioned within a second vessel 204 (e.g., an artery). The first and second catheters 110, 112 are substantially similar to that described above with respect to FIG. 1. The first and second catheters 110, 112 are advanced through the first and second vessels to a treatment site (e.g., where a fistula is to be formed). When the first and second catheters 110, 112 are positioned at or approximately at the treatment site, the external probe 118 may be advanced toward the treatment site to detect the strength of the magnetic field between one or more first catheter magnetic elements 120 of the first catheter 110 and the one or more second catheter magnetic elements 120 of the second catheter 112. For example, the external probe 118 may be advanced so as to be within a sensing range (e.g., within about 0.5 meters, within about 0.4 meters, with about 0.3 meters, etc.) of the one or more magnetic field sensors 116 of the external probe 118. The one or more magnetic field sensors 116 whether internal or external may automatically begin detecting the magnetic attraction between the first and second catheters 110, 112 when the first catheter magnetic elements 120 and the second catheter magnetic elements 122 begin attracting one another.

In some embodiments, the one or more magnetic elements 120 of the first and second catheters 110, 112 may include electromagnets. In such embodiments, an external magnetic field generator, not shown may be used to excite the electromagnets. Additionally, the electromagnets of the first and second catheters 110, 112 may be communicatively coupled to the control unit 104 and output electrical signals to the control unit indicative of their location in 3-dimensional space within the magnetic field produced by the magnetic field generator. For example, each of the electrical signals may be indicative of a location of the electromagnet relative to the magnetic field generator. Based on this information, the control unit 104 may execute logic to determine the locations of the first and second catheters 110, 112 relative to one another. Accordingly, the one or more magnetic elements 120 of the first and second catheters 110, 112 may act as location sensors or magnetic field sensors 116.

Referring again to FIG. 2, the system 100 further includes a user output device 140 communicatively coupled to the control unit 104 over the communication path 102. The user output device 140 may include any visual, tactile, or audible feedback device configured to output a ready signal when the control unit 104 determines, based on the magnetic field signal from the one or more magnetic field sensors 116, that the first and second catheters 110, 112 are within a proper distance and/or have proper alignment for fistula formation. For example, the user output device 140 may include a light indicator (e.g., a florescent light, an LED light, or the like) mounted to the external probe 118 or a handle of the first catheter 110 and/or the second catheter 112. The light indicator may be turned on by the control unit 104 in response to detecting that the first and second catheters 110, 112 are properly positioned relative to one another. In some embodiments, the light indicator may be a green light when it is determined that the first and second catheters 110, 112 are properly positioned. In some embodiments, the light indicator, or a separate indicator light, may be a red light when it is determined that the first and second catheters 110, 112 are not properly aligned. In some embodiments, an audible sound may be emitted from a speaker in response to achieving proper alignment.

In some embodiments, the system 100 may include a locking mechanism 150 that prevent activation of the fistula forming element 132 when it is determined that the first and second catheters 110, 112 are improperly aligned (e.g., not within the predetermined separation range). For example, the locking mechanism 150 may be communicatively coupled to the control unit 104 over the communication path 102 so as to be operable by the control unit 104. For example, the locking mechanism 150 may be a switch that electrically couples to fistula forming element 132 to a power source 160. It may be that the locking mechanism 150 is positioned to prevent flow of energy from the power source 160 to the fistula-forming element 132 (e.g., an electrode 134) in response to determining that the first and second catheters 110, 112 are improperly aligned. In some embodiments, the locking mechanism 150 may be positioned to prevent flow of energy to from the power source 160 to the fistula-forming element 132 until the control unit 104 determines that the first and second catheters 110, 112 are properly aligned. Other contemplated locking mechanisms may include, but are not limited to, magnetic locking mechanisms, relays, solenoids, interlock actuators, or the like.

In some embodiments, the power source 160 may be communicatively coupled to the control unit 104 such that the control unit 104 may selectively operate the power source 160 (e.g., a battery, an RF generator, an outlet, or the like). In such embodiments, the control unit 104 may be configured to prevent operation of the power source 160 from energizing the fistula-forming element 132 when it is determined that the first and second catheters 110, 112 are not properly aligned.

A method of forming a fistula between a first vessel 202 and a second vessel 204 will now be described. With reference to FIG. 5, the method includes advancing the first catheter 110 through the first vessel 202 to a treatment site and advancing the second catheter 112 through the second vessel 204 to the treatment site. As the one or more magnetic elements 120 of the first and second catheters 110, 112 approach one another so as to be aligned within one another, the one or more or magnetic field sensors 116 (e.g., either internal or external magnetic field sensors 116, may automatically begin detecting the magnetic field produced between the one or more first catheter magnetic elements 120 of the first catheter 110 and the one or more second catheter magnetic elements 122 of the second catheter 112. The control unit 104 may receive the signal from the one or more magnetic field sensors 116 and execute logic to determine the distance of separation of the first catheter 110 from the second catheter 112 (e.g., the axial offset distance, D, of the one or more magnetic elements 120 of the first catheter 110 from the one or more magnetic elements 120 of the second catheter 112). Once it is determined that the distance of separation of the first catheter 110 from the second catheter 112 is within a predetermined range (e.g., 1 mm or less) and/or the proper rotational alignment is achieved, the control unit 104 may generate a ready signal with the user output device 140. At that point, the operator of the system 100 may form a fistula with the fistula-forming element 132 between the first and second vessels. For example, the operator may advance the electrode 134 or may cause energy to flow through the electrode 134 to ablate tissue of the first vessel 202 and the second vessel 204 impinged between the first catheter 110 and the second catheter 112. As noted above, where it is determined that proper alignment and distance have not been achieved, the control unit 104 may operate a locking mechanism 150 or the power source 160 to prevent fistula formation until proper alignment is achieved.

In some embodiments, additional visual confirmation with fluoroscopy, ultrasound, or the like may be used.

Embodiments can be described with reference to the following numbered clauses, with preferred features laid out in the dependent clauses.

1. A system for forming a fistula comprising: a first catheter configured to be advanced through a first vessel, the first catheter comprising one or more first catheter magnetic elements and a fistula-forming element; a second catheter configured to be advanced through a second vessel, the second catheter comprising one or more second catheter magnetic elements, wherein the one or more first catheter magnetic elements and the one or more second catheter magnetic elements are configured to draw the first catheter and the second catheter together; one or more magnetic field sensors configured to output a magnetic field signal indicative of a magnitude of a magnetic field produced between the one or more first catheter magnetic elements and the one or more second catheter magnetic elements; a user output device configured to output a ready signal; and a controller communicatively coupled to the one or more magnetic field sensors and the user output device, wherein the controller is configured to: receive the magnetic field signal from the one or more magnetic field sensors; determine a distance of separation of the first catheter from the second catheter based on the magnetic field signal from the one or more magnetic field sensors; and output the ready signal with the user output device in response to determining that the distance of separation of the first catheter from the second catheter is a predetermined distance or less, wherein the ready signal is indicative of proper alignment and position of the first catheter and the second catheter to form the fistula with the fistula-forming element.

2. The system of clause 1, wherein the fistula-forming element is positioned proximal to a tip of the first catheter and is extendable from a sidewall of the first catheter.

3. The system of any preceding clause, wherein the one or more magnetic field sensors is coupled to at least one of the first catheter and the second catheter.

4. The system of any preceding clause, wherein the one or more magnetic field sensors comprise a first magnetic field sensor coupled to the first catheter and a second magnetic field sensor coupled to the second catheter.

5. The system of any preceding clause, wherein the user output device includes an indicator light.

6. The system of any preceding clause, wherein the controller is further configured to prevent operation of the fistula-forming element when it is determined that the distance of separation between the first catheter and the second catheter is greater than the predetermined distance.

7. The system of clause 6, wherein the fistula-forming element comprises an electrode coupled to a power source for energizing the electrode, wherein the controller is communicatively coupled the power source, and the controller is configured to operate the power source to prevent energizing of the electrode when it is determined that the distance of separation between the first catheter and the second catheter is greater than the predetermined distance.

8. The system of any preceding clause, wherein the one or more magnetic field sensors comprise at least one of a Hall Effect sensor, a magnetoresistive sensor, a microelectromechanical systems sensor, and/or a super conducting quantum interference device sensor.

9. A system for forming a fistula comprising: a first catheter configured to be advanced through a first vessel, the first catheter comprising one or more first catheter magnetic elements and a fistula-forming element; a second catheter configured to be advanced through a second vessel, the second catheter comprising one or more second catheter magnetic elements, wherein the one or more first catheter magnetic elements and the one or more second catheter magnetic elements are configured to draw the first catheter and the second catheter together; a probe configured to be positioned external to a treatment site, the probe comprising one or more magnetic field sensors configured to output a magnetic field signal indicative of a magnitude of a magnetic field produced between the one or more first catheter magnetic elements and the one or more second catheter magnetic elements; a user output device configured to output a ready signal; and a controller communicatively coupled to the one or more magnetic field sensors and the user output device, wherein the controller is configured to: receive the magnetic field signal from the one or more magnetic field sensors; determine a distance of separation of the first catheter from the second catheter based on the magnetic field signal from the one or more magnetic field sensors; and output the ready signal with the user output device in response to determining that the distance of separation of the first catheter from the second catheter is a predetermined distance or less, wherein the ready signal is indicative of proper alignment and position of the first catheter and the second catheter to form the fistula with the fistula-forming element.

10. The system of clause 9, wherein the fistula-forming element is positioned proximal to a tip of the first catheter and is extendable from a sidewall of the first catheter.

11. The system of clause 9 or 10, wherein the user output device includes an indicator light coupled to the probe.

12. The system of any of clauses 9-11, wherein the controller further is configured to prevent operation of the fistula-forming element when it is determined that the distance of separation between the first catheter and the second catheter is greater than the predetermined distance.

13. The system of clause 12, wherein the fistula-forming element comprises an electrode coupled to a power source for energizing the electrode, wherein the controller is communicatively coupled the power source, wherein the controller is configured to operate the power source to prevent energizing of the electrode when it is determined that the distance of separation between the first catheter and the second catheter is greater than the predetermined distance.

14. The system of any of clauses 9-12, wherein the one or more magnetic field sensors comprise at least one of a Hall Effect sensor, a magnetoresistive sensor, a microelectromechanical systems sensor, and a super conducting quantum interference device sensor.

15. A method of forming a fistula comprising: advancing a first catheter through a first vessel, wherein the first catheter comprises one or more first catheter magnetic elements and a fistula-forming element; advancing a second catheter through a second vessel, wherein the second catheter comprises one or more second catheter magnetic elements; aligning the one or more first catheter magnetic elements with the one or more second catheter magnetic elements; detecting a magnetic field produced between the one or more first catheter magnetic elements and the one or more second catheter magnetic elements with one or more magnetic field sensors; determining a distance of separation of the first catheter from the second catheter based on a magnetic field signal from the one or more magnetic field sensors; generating a ready signal with user output device in response to determining that the distance of separation of the first catheter from the second catheter is about a predetermined distance or less, wherein the ready signal is indicative of proper alignment and position of the first catheter and the second catheter; and forming the fistula with the fistula-forming element in response to the ready signal.

16. The method of clause 15, further comprising preventing operation of the fistula-forming element when it is determined that the distance of separation between the first catheter and the second catheter is greater than the predetermined distance.

17. The method of clause 16, wherein the fistula-forming element comprises an electrode coupled to a power source and operation of the power source is prevented when it is determined that the distance of separation between the first catheter and the second catheter is greater than the predetermined distance.

18. The method of any of clauses 15-17, wherein the one or more magnetic field sensors is coupled to at least one of the first catheter and the second catheter.

19. The method of any of clauses 15-18, wherein the one or more magnetic field sensors comprise a first magnetic field sensor coupled to the first catheter and a second magnetic field sensor coupled to the second catheter.

20. The method of any of clauses 15-19, wherein the one or more magnetic field sensors are coupled to a probe positioned external to a treatment site.

It should now be understood that embodiments described herein are directed to using one or more magnetic field sensors that detect the magnetic field produced between the magnetic elements of the first and second catheters. Based on the detected magnetic field, a control unit may determine distance and/or alignment of the first and second catheters. When the appropriate distance and alignment has been reached, a signal may be output by the control unit, which alerts an operator that the first and second catheters are correctly positioned for fistula formation. In some embodiments, the control unit may be operable to prevent activation of the fistula-forming element where the control unit determines that the first and second catheters are not positioned within an appropriate distance of one another or otherwise improperly aligned. Such systems provided several clinical benefits including the use of less or no fluoroscopy, as magnetic sensing may provide confirmation to both separation distance and rotational alignment. The system also minimizes operator subjectivity when reading fluoroscopy, or other 2-dimensional, images.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for forming a fistula comprising:
a first catheter configured to be advanced through a first vessel, the first catheter comprising one or more first catheter magnetic elements and a fistula-forming element;
a second catheter configured to be advanced through a second vessel, the second catheter comprising one or more second catheter magnetic elements, wherein the one or more first catheter magnetic elements and the one or more second catheter magnetic elements are configured to draw the first catheter and the second catheter together;

one or more magnetic field sensors configured to output a magnetic field signal indicative of a magnitude of a magnetic field produced between the one or more first catheter magnetic elements and the one or more second catheter magnetic elements;

a user output device configured to output a ready signal; and a controller communicatively coupled to the one or more magnetic field sensors and the user output device, wherein the controller is configured to:

receive the magnetic field signal from the one or more magnetic field sensors;

determine a distance of separation of the first catheter from the second catheter based on the magnetic field signal from the one or more magnetic field sensors; and output the ready signal with the user output device in response to determining that the distance of separation of the first catheter from the second catheter is a predetermined distance or less, wherein the ready signal is indicative of proper alignment and position of the first catheter and the second catheter to form the fistula with the fistula-forming element.

2. The system of claim 1, wherein the fistula-forming element is positioned proximal to a tip of the first catheter and is extendable from a sidewall of the first catheter.

3. The system of claim 1, wherein the one or more magnetic field sensors is coupled to at least one of the first catheter and the second catheter.

4. The system of claim 1, wherein the one or more magnetic field sensors comprise a first magnetic field sensor coupled to the first catheter and a second magnetic field sensor coupled to the second catheter.

5. The system of claim 1, wherein the user output device includes an indicator light.

6. The system of claim 1, wherein the controller is further configured to prevent operation of the fistula-forming element when it is determined that the distance of separation between the first catheter and the second catheter is greater than the predetermined distance.

7. The system of claim 6, wherein the fistula-forming element comprises an electrode coupled to a power source for energizing the electrode, wherein the controller is communicatively coupled the power source, and the controller is configured to operate the power source to prevent energizing of the electrode when it is determined that the distance of separation between the first catheter and the second catheter is greater than the predetermined distance.

8. The system of claim 1, wherein the one or more magnetic field sensors comprise at least one of a Hall Effect sensor, a magnetoresistive sensor, a microelectromechanical systems sensor, and/or a super conducting quantum interference device sensor.

9. A system for forming a fistula comprising:

a first catheter configured to be advanced through a first vessel, the first catheter comprising one or more first catheter magnetic elements and a fistula-forming element;

a second catheter configured to be advanced through a second vessel, the second catheter comprising one or more second catheter magnetic elements, wherein the one or more first catheter magnetic elements and the one or more second catheter magnetic elements are configured to draw the first catheter and the second catheter together;

a probe configured to be positioned external to a treatment site, the probe comprising one or more magnetic field sensors configured to output a magnetic field signal indicative of a magnitude of a magnetic field produced between the one or more first catheter magnetic elements and the one or more second catheter magnetic elements;

a user output device configured to output a ready signal; and a controller communicatively coupled to the one or more magnetic field sensors and the user output device, wherein the controller is configured to:

receive the magnetic field signal from the one or more magnetic field sensors;

determine a distance of separation of the first catheter from the second catheter based on the magnetic field signal from the one or more magnetic field sensors; and output the ready signal with the user output device in response to determining that the distance of separation of the first catheter from the second catheter is a predetermined distance or less, wherein the ready signal is indicative of proper alignment and position of the first catheter and the second catheter to form the fistula with the fistula-forming element.

10. The system of claim 9, wherein the fistula-forming element is positioned proximal to a tip of the first catheter and is extendable from a sidewall of the first catheter.

11. The system of claim 9, wherein the user output device includes an indicator light coupled to the probe.

12. The system of claim 9, wherein the controller further is configured to prevent operation of the fistula-forming element when it is determined that the distance of separation between the first catheter and the second catheter is greater than the predetermined distance.

13. The system of claim 12, wherein the fistula-forming element comprises an electrode coupled to a power source for energizing the electrode, wherein the controller is communicatively coupled the power source, wherein the controller is configured to operate the power source to prevent energizing of the electrode when it is determined that the distance of separation between the first catheter and the second catheter is greater than the predetermined distance.

14. The system of claim 9, wherein the one or more magnetic field sensors comprise at least one of a Hall Effect sensor, a magnetoresistive sensor, a microelectromechanical systems sensor, and a super conducting quantum interference device sensor.

15. A method of forming a fistula comprising:

advancing a first catheter through a first vessel, wherein the first catheter comprises one or more first catheter magnetic elements and a fistula-forming element;

advancing a second catheter through a second vessel, wherein the second catheter comprises one or more second catheter magnetic elements;

aligning the one or more first catheter magnetic elements with the one or more second catheter magnetic elements;

detecting a magnetic field produced between the one or more first catheter magnetic elements and the one or more second catheter magnetic elements with one or more magnetic field sensors;

determining a distance of separation of the first catheter from the second catheter based on a magnetic field signal from the one or more magnetic field sensors;

generating a ready signal with user output device in response to determining that the distance of separation of the first catheter from the second catheter is a predetermined distance or less, wherein the ready signal is indicative of proper alignment and position of the first catheter and the second catheter; and forming the fistula with the fistula-forming element in response to the ready signal.

16. The method of claim 15, further comprising preventing operation of the fistula-forming element when it is determined that the distance of separation between the first catheter and the second catheter is greater than predetermined distance.

17. The method of claim 16, wherein the fistula-forming element comprises an electrode coupled to a power source and operation of the power source is prevented when it is determined that the distance of separation between the first catheter and the second catheter is greater than the predetermined distance.

18. The method of claim 15, wherein the one or more magnetic field sensors is coupled to at least one of the first catheter and the second catheter.

19. The method of claim 15, wherein the one or more magnetic field sensors comprise a first magnetic field sensor coupled to the first catheter and a second magnetic field sensor coupled to the second catheter.

20. The method of claim 15, wherein the one or more magnetic field sensors are coupled to a probe positioned external to a treatment site.

\* \* \* \* \*